(12) United States Patent
Jeong

(10) Patent No.: US 12,380,042 B2
(45) Date of Patent: Aug. 5, 2025

(54) STORAGE DEVICE FOR OUTPUTTING INTERRUPT AND METHOD OF OPERATING THE SAME

(71) Applicant: Samsung Electronics Co., Ltd., Suwon-si (KR)

(72) Inventor: Jongheon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 18/422,907

(22) Filed: Jan. 25, 2024

(65) Prior Publication Data

US 2025/0045223 A1    Feb. 6, 2025

(30) Foreign Application Priority Data

Aug. 3, 2023   (KR) .................. 10-2023-0101448

(51) Int. Cl.
*G06F 13/24*        (2006.01)

(52) U.S. Cl.
CPC .................................. *G06F 13/24* (2013.01)

(58) Field of Classification Search
CPC ....................................................... G06F 13/24
See application file for complete search history.

(56) References Cited

U.S. PATENT DOCUMENTS

| | | | |
|---|---|---|---|
| 6,985,811 B2 | 1/2006 | Gronemeyer | |
| 7,519,847 B2 | 4/2009 | Sultenfuss et al. | |
| 8,799,545 B2 | 8/2014 | Erickson et al. | |
| 10,761,923 B2* | 9/2020 | Hicks | G06F 11/1004 |
| 11,809,350 B2* | 11/2023 | Zhao | G06F 13/4291 |
| 2004/0225439 A1 | 11/2004 | Gronemeyer | |
| 2008/0071879 A1 | 3/2008 | Park | |
| 2016/0246244 A1* | 8/2016 | Mori | B41J 15/048 |
| 2017/0017559 A1* | 1/2017 | Jarok | G06F 13/4282 |
| 2017/0041688 A1 | 2/2017 | Pitigoi-Aron et al. | |
| 2017/0091127 A1* | 3/2017 | Khan | G06F 13/4282 |

FOREIGN PATENT DOCUMENTS

| | | |
|---|---|---|
| CN | 103645975 A | 3/2014 |
| CN | 112506838 A | 3/2021 |
| CN | 114968681 A | 8/2022 |

* cited by examiner

*Primary Examiner* — Henry Tsai
*Assistant Examiner* — Christopher A Daley
(74) *Attorney, Agent, or Firm* — Muir Patent Law, PLLC

(57) ABSTRACT

A method of operating a storage device includes receiving a clock signal corresponding to a plurality of data bits and an acknowledgement (ACK) signal from a host device through a clock line during a read operation, outputting a data signal including the plurality of data bits from the storage device through a data line during the read operation, generating an interrupt signal when the clock signal is at a low level before outputting the last data bit from among the plurality of data bits, transmitting the interrupt signal to the host device through the data line, and receiving a not-acknowledgment (NACK) signal from the host device through the data line in response to the interrupt signal when there is clock loss of the clock signal.

20 Claims, 11 Drawing Sheets

| Symbol | Parameters | 100 kHz Class | | 400 kHz Class | | 1 kHz Class | | Units |
| --- | --- | --- | --- | --- | --- | --- | --- | --- |
| | | Min | Max | Min | Max | Min | Max | |
| $f_{SMB}$ | SMBus Operating Frequency | 10 | 100 | 10 | 400 | 10 | 1000 | kHz |
| $t_{BUF}$ | Bus freem time between STOP and START Condition | 4.7 | — | 1.3 | — | 0.5 | — | $\mu s$ |
| $t_{HD:STA}$ | Hold time after(REPEATED)START Condition | 4.0 | — | 0.6 | — | 0.26 | — | $\mu s$ |
| $t_{SU:STA}$ | REPEATED START Condition setup time | 4.7 | — | 0.6 | — | 0.26 | — | $\mu s$ |
| $t_{SU:STO}$ | STOP Condition setup time | 4.0 | — | 0.6 | — | 0.26 | — | $\mu s$ |
| $t_{HD:DTA}$ | Data hold time | 0 | 500 | 0 | 260 | 0 | 120 | ns |
| $t_{SU:DTA}$ | Data setup time | 250 | 1300 | 100 | 500 | 50 | 210 | ns |
| $t_{TIMEOUT}$ | Detect clock low timeout | 25 | 35 | 25 | 35 | 25 | 35 | ms |
| $t_{LOW}$ | Clock low period | 4.7 | — | 1.3 | — | 0.5 | — | $\mu s$ |
| $t_{HIGH}$ | Clock high period | 4.0 | 50 | 0.6 | 50 | 0.26 | 50 | $\mu s$ |
| $t_{LBR\_HIGH}$ | Data high period(for LBR signal) | 1.3 | 2.7 | 0.26 | 0.44 | 0.12 | 0.17 | $\mu s$ |

FIG. 5

STORAGE DEVICE FOR OUTPUTTING INTERRUPT AND METHOD OF OPERATING THE SAME

CROSS-REFERENCE TO RELATED APPLICATION(S)

This application claims benefit of priority to Korean Patent Application No. 10-2023-0101448 filed on Aug. 3, 2023 in the Korean Intellectual Property Office, the disclosure of which is incorporated herein by reference in its entirety.

BACKGROUND

Example embodiments of the present disclosure relate to a storage device for outputting an interrupt and a method of operating the same.

Generally, a System Management Bus (SMBus) is a 2-wire interface based on an Inter-Integrated Circuit ($I^2C$) bus, enabling simple communication between various hardware components of a system. SMBus is commonly used in PCs for system-level management tasks such as power management, system settings, battery charging, temperature sensors, and fan control, among others. While the data transfer rate of these interfaces is not fast, they are reliable, easy to use, and can be connected using a relatively small number of pins. However, during some clock transfer processes of a SMBus operation, it is damaged or ignored by a receiver. Therefore, it is desired to detect if there are any errors during communication.

SUMMARY

An example embodiment of the present disclosure is to provide a storage device for outputting an interrupt and a method of operating the same.

According to an example embodiment of the present disclosure, a method of operating a storage device includes receiving a clock signal corresponding to a plurality of data bits and an acknowledgement (ACK) signal (or an ACK bit) from a host device through a clock line during a read operation; outputting a data signal including the plurality of data bits from the storage device through a data line during the read operation; generating an interrupt signal when the clock signal is at a low level before outputting the last data bit from among the plurality of data bits; transmitting the interrupt signal to the host device through the data line; and receiving a not-acknowledgment (NACK) signal from the host device through the data line in response to the interrupt signal when there is clock loss of the clock signal.

According to an example embodiment of the present disclosure, a storage device includes at least one nonvolatile memory device; and a controller configured to control the at least one nonvolatile memory device, and receive a clock signal from a host device. The controller communicates with the host device through a first interface or output environmental information to the host device through a second interface. The controller generates an interrupt signal when the clock signal is at a low level during a read operation for the environment information, and outputs the interrupt signal to the host device through a data line.

According to an example embodiment of the present disclosure, a host system includes a storage device; and a host device connected through a clock line and a data line. The host device is configured to transmit a clock signal corresponding to a plurality of data bits and an ACK signal to the storage device through the clock line, to receive a data signal including the plurality of data bits from the storage device through the data line, to receive an interrupt signal through the data line in a section in which the clock signal is at a low level before the last data bit from among the plurality of data bits is received, to first determine whether a time point of a predetermined data bit position is an expected time point in response to the interrupt signal, and to second determine to generate a NACK signal according to a result of the first determination.

According to an example embodiment of the present disclosure, a method of operating a communication system includes outputting a byte clock signal from a master device to a slave device through a clock line during a read operation; outputting a last bit ready (LBR) interrupt from the slave device to the master device in response to the byte clock signal through a data line; and outputting an ACK/NACK signal from the master device to the slave device in response to the LBR interrupt through the data line.

BRIEF DESCRIPTION OF DRAWINGS

The above and other aspects, features, and advantages of the present disclosure will be more clearly understood from the following detailed description, taken in combination with the accompanying drawings, in which:

FIG. 5 is a diagram illustrating AC parameters for LBR interrupt according to an example embodiment of the present disclosure;

DETAILED DESCRIPTION

Figure 1A:
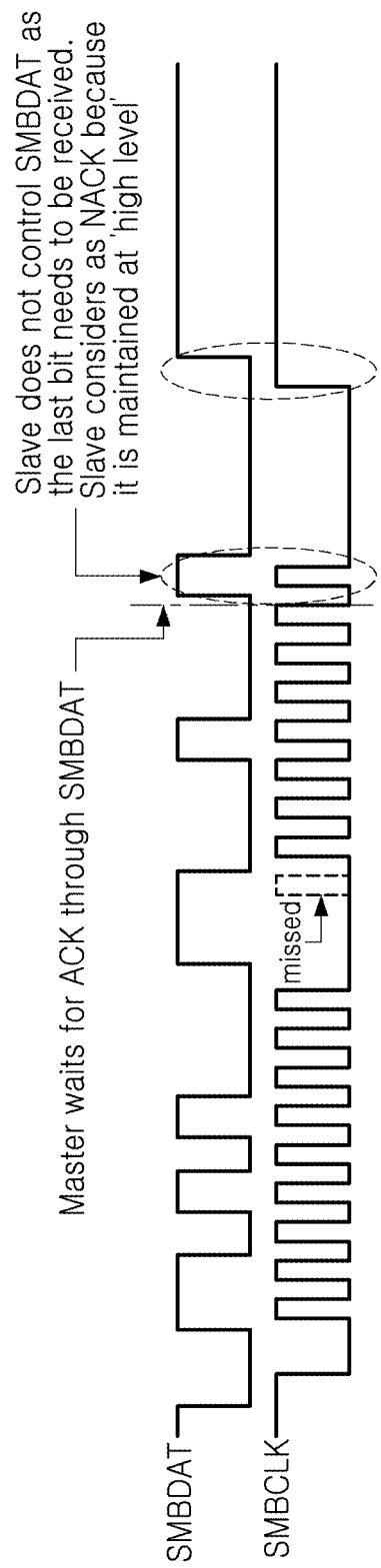
FIG. 1A is a diagram illustrating timing according to clock omission during a write operation of a general SMBus communication.

Hereinafter, embodiments of the present disclosure will be described as follows with reference to the accompanying drawings.

According to an embodiment of the present invention, a storage device and an operating method may immediately perceive and correct a situation where, during some clock transfer processes of SMBus (System Management Bus)

operation, it is damaged or ignored by the receiver through an interrupt. The storage device may transmit an SMBDAT signal-based interrupt periodically at a specific point for every byte transmitted. The host device may synchronize by generating additional clocks to match the data output point based on the interrupt received from the storage device and comparing them, if they don't match.

Generally, the SMBus interface supports packet error detection features, timeout determination features, and low-power mode features. Packet error detection features check if there are any errors during packet transmission. Timeout determination features allow the SMBus controller to reset the device if the operation is not completed within a certain time, allowing the bus to continue operating. Low-power mode features allow SMBus devices to save energy by switching to low power mode. Thanks to these features, SMbus supports stable and efficient communication between hardware systems and is used in various applications, including power management, firmware updates, supply chain management, and temperature monitoring.

Below is a brief explanation of the terms used in the SMBus interface. SMBus includes a physical layer to communicate system management information and includes its operating method and contents. SMBus includes two signals controlling the clock and data. A SMBus master device (hereinafter, master device) is the entity with communication rights at that point. It has full control over clock generation and control and may generate START/STOP conditions. A SMBus slave device (hereinafter, slave device) reads or controls the SMBDAT signal in accordance with a clock signal generated by the master device. In the section where SMBCLK=high, the slave device cannot change a level of SMBDAT. SMBCLK is a signal controlled by the master device to generate the clock signal. The logical value of SMBDAT corresponding to the section where SMBCLK=high is read or written. The SMBDAT is a signal controlled to generate logical values in accordance with the clock signal. During read operations, the slave device controls the SMBDAT. During write operations, the master device controls SMBDAT. An acknowledgment/not-acknowledgment (ACK/NACK) bit is controlled by the receiver. The ACK/NACK bit is the ninth bit attached to each data byte. Through the value of this bit (1: NACK/0: ACK), the reception of the corresponding data by the counterpart may be confirmed. Herein, for convenience of description, the terms of the "ACK bit" and "ACK signal" and the terms of the "NACK bit" and "NACK signal" may be used interchangeably.

The START condition may only be generated by the master device. The START condition is an interrupt signaling the start of an SMBus command. The START condition is generated by changing SMBDAT from high to low in the section where SMBCLK=high. The START condition is generated according to the falling edge trigger of SMBDAT. The STOP condition may only be generated by the master. The STOP condition is an interrupt signaling the end of an SMBus command. The STOP condition may be generated by changing SMBDAT from low to high in the section where SMBCLK=high. In other words, the STOP condition is generated according to the rising edge trigger of SMBDAT.

Generally, the generation of signals is only possible by the master device. The slave device simply outputs or reads data according to this. There is no way to check for the omission of signals. This means that the data may only be output without distinguishing whether the corresponding signal is a bit address pulled forward due to previous omission. Even though the signal which the master device intends to create is lost, there is no way to notify this, and it continues to receive delayed data values from the slave device. Because of this, SMBus reads may be performed with invalid values. Eventually, it may receive a device fail judgment from the host device.

Typically, the host device regularly accesses and logs the status flags or critical warning areas, such as error reports, through the SMBus, for example, every second. During this process, some critical warnings may be perceived as set, reading delayed data values, or the device may fail by reading abnormal temperatures. Many cases are processed as errors with a single detection. Due to this, even the normally operating in-band communication area may be restricted or terminated.

Generally, SMBus continues ongoing communication until the host device generates a STOP condition. Eventually, it cannot end this despite the problem situation continuing to the next bytes. It is persisting in communication to receive invalid data without knowing when it will end. Additionally, as the SMBus master device may communicate with only one slave device at a time, communication with other slave devices cannot proceed during this section, causing communication failure and delay.

FIG. 1A is a diagram illustrating timing according to clock omission during a write operation of general SMBus communication. Basically, the above-mentioned communication issue due to clock omission may not occur in a write operation, which may indicate that, when signal loss occurs in a write operation, at the time point when the host device sets SMBDAT to receive ACK/NACK, the slave device may wait to receive data without knowing whether there is signal loss and may maintain SMBDAT=high, which, from the perspective of the host device, may be automatically determined as a write fail by being accepted as a NACK from the slave device.

Figure 1B:
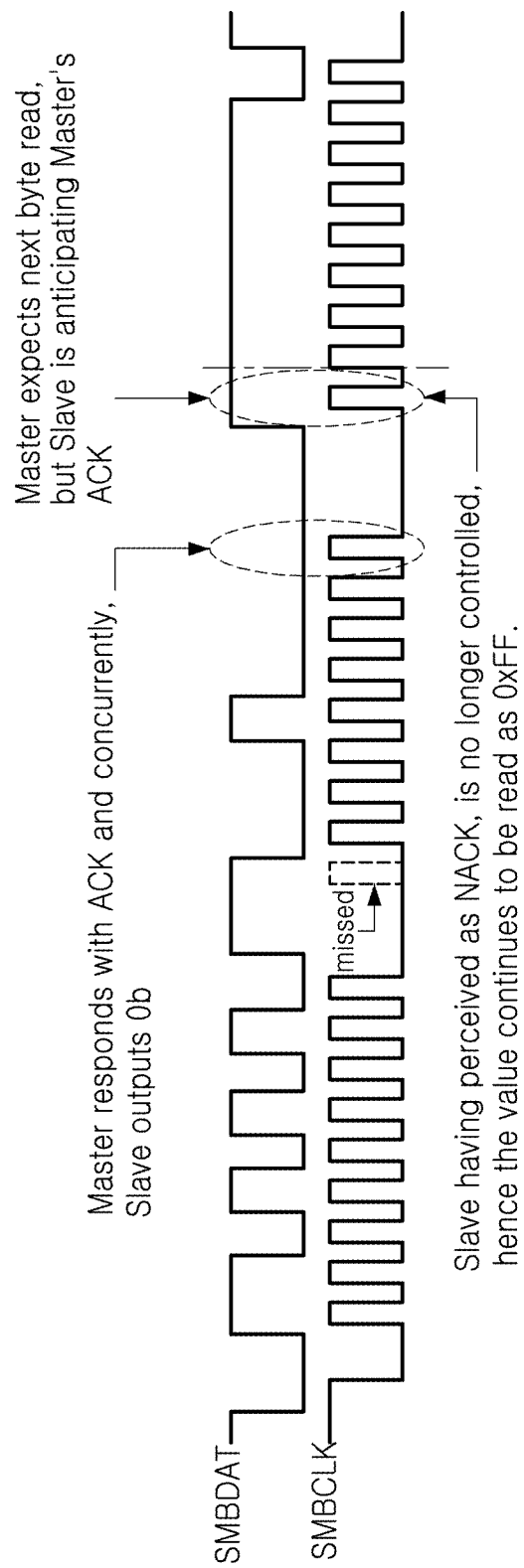
FIG. 1B is a diagram illustrating communication failure due to clock omission during a read operation of general SMBus.

FIG. 1B is a diagram illustrating communication failure due to clock omission during a read operation of a general SMBus. As illustrated in FIG. 1B, when the device outputs "0b" at the time point when the host device wants to respond with an ACK, this may overlap the ACK transmitted from the perspective of master device. Accordingly, even though a clock signal is lost, the host device may not recognize this situation and may consider the situation as a normal operation. Thereafter, reading invalid data from the slave device may continue.

A storage device and a method of operating the same according to an example embodiment may recognize a situation in which a portion of the SMBCLK is not transmitted or received, and may perform a termination and a bus free command, thereby preventing the situations in which the system bus is occupied by unnecessary communication, causing communication delays and conflicts with other slave devices. In example embodiments, as the slave device abandons communication due to an error in the clock, the problem in which incorrect data (e.g., "0xFF") is continuously read may be solved. Also, in example embodiments, continuity of clock supply may be obtained by deploying an alternative module to maintain the supply of a clock temporarily deactivated in a low power mode in real time. In example embodiments, for clock transmission/reception defects occurring between operations, by communicating and recognizing the defective situation based on an interrupt rather than a module, both communication entities may restore the clock and may terminate communication based on the interrupt criteria.

Figure 2:
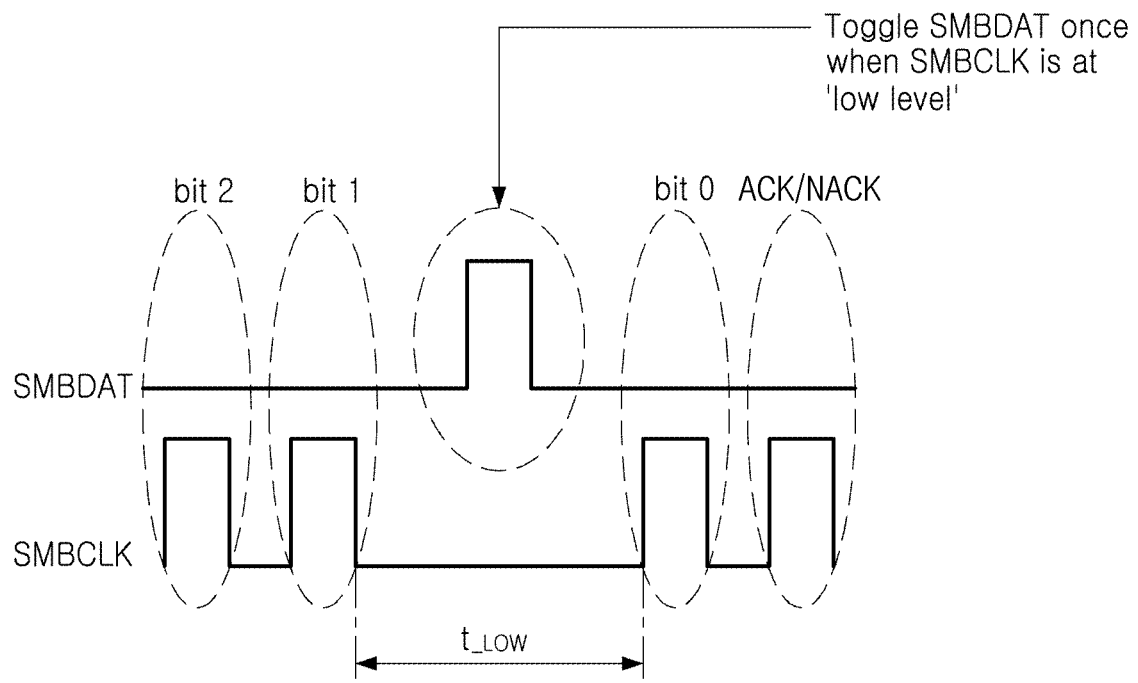
FIG. 2 is a diagram illustrating a communication operation of SMBus according to an example embodiment of the present disclosure.

FIG. 2 is a diagram illustrating a communication operation of SMBus according to an example embodiment. In example embodiments, both communication entities may recognize loss in signals corresponding to the 9 bits (8 data bits+1 ACK/NACK bit) forming each byte. Accordingly, when a loss problem occurs, the master device (or the slave device) may transmit the information to the slave device (or master device) through a signal, or may at least provide criteria which may be identified independently. Here, the receiving side may be the entity responding with ACK/NACK, and may be the side attempting to read during a read operation, and may be the side receiving data between write operations.

In example embodiments, the slave device may transmit an interrupt through SMBDAT such that the master device checks for signal loss. To introduce this new interrupt, the following two points may be considered: Basically, changing the SMBDAT level in sections in which SMBCLK=high is prohibited. In the section in which SMBCLK=low, changes in SMBDAT level may not be recognized as interrupts, and may not affect existing communications. As SMBDAT is identified for transmission and reception in byte units, the slave device may transmit an interrupt at this time point using the time before and after the boundary between bytes as a criterion point. Accordingly, in the section prior to transmission of the last 8th bit, Bit 0, between transmissions of each byte, by "toggle SMBDAT at SMBCLK=low," an interrupt may be transmitted to the host device. Herein, the Bit 0 may mean a data bit position of the last 8th bit. In the description below, the interrupt may be referred to as last bit ready (hereinafter, LBR) interrupt.

Figure 3:
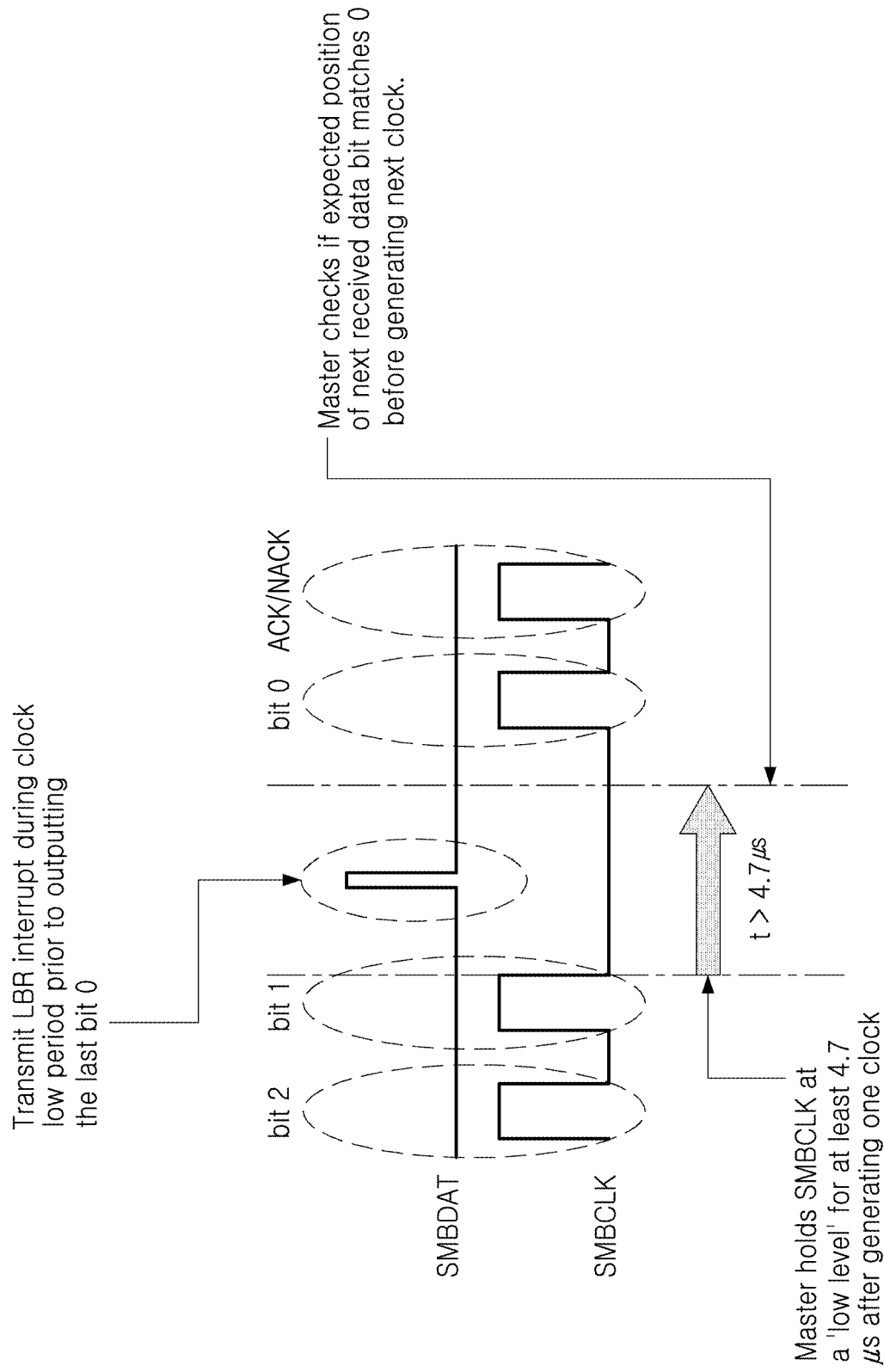
FIG. 3 is a diagram illustrating an LBR interrupt operation of SMBus communication according to an example embodiment of the present disclosure.

FIG. 3 is a diagram illustrating an LBR interrupt operation of SMBus communication according to an example embodiment. From the perspective of master device, determining whether there is signal loss based on data values alone may be accompanied with uncertainty. For example, when the device temperature is read as being abnormally high, the master device may not arbitrarily determine whether the temperature is actually high (due to signal loss) or a misread value. Also, even when the signal is lost, the pushed data value may accidentally be read as a value within the normal range. Accordingly, determining whether a physical signal is missing may be guaranteed by receiving an interrupt from the slave device to ensure high reliability. The master device may receive an interrupt from the slave device occurring between the ends of each byte and the master device may use the interrupt as criteria to determine synchronization with the signal being generated. Ultimately, the LBR interrupt may become a criterion which may periodically check for each byte whether the time point intended by the master device matches the time point recognized by the slave device.

In example embodiments, the master device may hold the SMBDAT at a low level for at least 4.7 µs before outputting the last bit and after generating one clock.

When the signal is lost, the boundary time point between the bytes recognized by the slave device and the boundary time point between the bytes intended by the master device may differ by the number of bits. Simultaneously, as the slave device expects to receive an interrupt at a previously recognized boundary time point, when receiving an interrupt at a different time point, the device may detect errors through the interrupt.

The slave device may need to transfer control authority of SMBDAT to the master device to receive ACK/NACK immediately after outputting up to the 8th bit. Accordingly, from this time point, the slave device may not randomly generate interrupts. Accordingly, among the 0 to 7 bit output sections in which the slave device has control authority for SMBDAT, an LBR interrupt may be generated just before the output of the last bit. Accordingly, the data address recognized by the slave device may be transmitted to the master device. The master device may, by comparing the time points with the criteria of the clock signal being generated, determine subsequent operations based on whether the time points match.

The LBR interrupt generated as described above may be used solely for timing synchronization between both communication entities. As the interrupt is used in sections in which data is not output, the interrupt may not affect existing SMBus communication.

The slave device may hold SMBDAT when determining that byte transmission has not been completed. Accordingly, the master device may not be able to generate a STOP condition. Accordingly, it may be necessary to temporarily adjust the byte align criteria to the slave device. It may be important to terminate the communication as swiftly as possible once an error has been determined. Accordingly, when this issue occurs during reading, the master device may generate an additional clock signal according to the slave device criteria and may terminate the read operation under the NACK and STOP condition.

Figure 4:
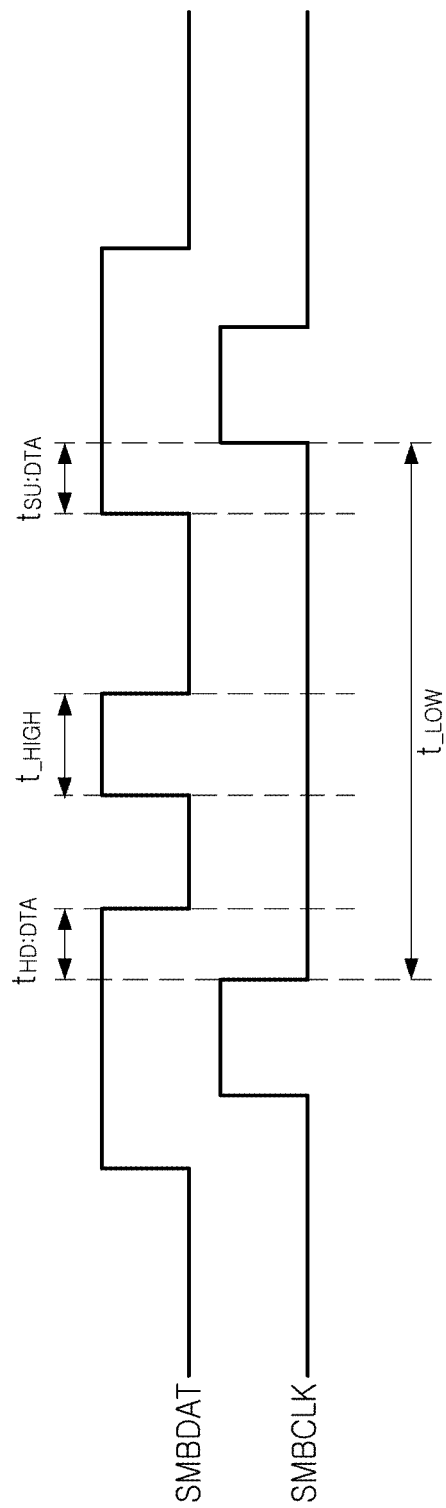
FIG. 4 is a diagram illustrating AC parameters of LBR interrupt according to an example embodiment of the present disclosure.

FIG. 4 is a diagram illustrating AC parameters of LBR interrupt according to an example embodiment. Differently from peripheral component interconnect express (PCIe) interface in which both communication entities operate with their own transceivers, the SMBus interface may physically share a transmitter (SMBDAT output control). Accordingly, the control authority of SMBDAT may change depending on the communication time point. This control authority may be presented through AC parameters. Until ACK/NACK, the slave device may have SMBDAT control authority over the entirety of sections between bits. As illustrated in FIG. 4, within the range of the $t_{\_LOW}$ section, an LBR interrupt may be generated by setting SMBDAT high as much as the intended section and holding the SMBDAT low again.

FIG. 5 is a diagram illustrating AC parameters for LBR interrupt according to an example embodiment. FIG. 5 illustrate various AC parameters for transfer of control at various frequencies.

LBR interrupt generation according to an example embodiment may need to satisfy the equation as below.

$$t\_LOW > t_{HD:DAT} + t_{SU:DAT} + t_{LBR\ HIGH} \qquad \text{[Equation 1]}$$

To set the time $t_{LBR\_HIGH}$ range of the LBR interrupt, an upper limit may be specified for data holding time $t_{HD:DAT}$ and data setup time $t_{SU:DAT}$. By substituting the upper and lower limits and subtracting from the clock low period $t_{\_LOW}$, the range of the LBR interrupt time $t_{LBR\_HIGH}$ value may be calculated. Operational stability may be ensured by giving an arbitrary margin to the calculated value.

Figure 6A:
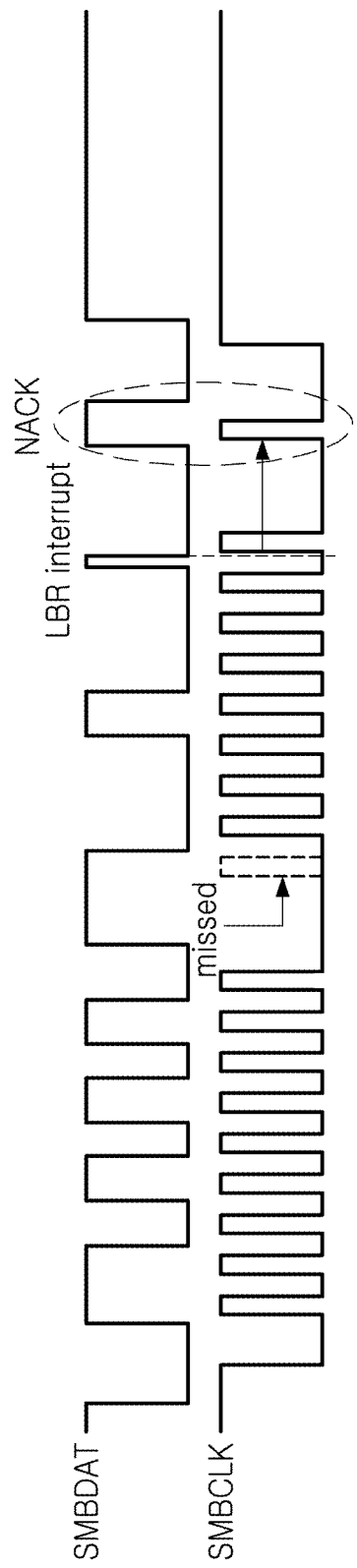
FIG. 6A is a timing diagram illustrating SMBus operation when clock loss occurs according to an example embodiment of the present disclosure.

FIG. 6A is a timing diagram illustrating SMBus operation when clock loss occurs according to an example embodiment. Between read operations, the slave device may transmit an LBR interrupt through SMBDAT just before outputting the 8th bit (last bit). The master device may compare the byte align with the LBR interrupt criteria, and when the time point of a predetermined data bit (i.e. Bit 0) is different from an expected time point, the master device may immediately respond with NACK and may terminate the read operation. In an example embodiment, the master device may terminate the read operation with a STOP condition corresponding to the NACK signal (or the NACK bit). For example, when the predetermined data bit position (i.e., Bit 0) is not 0 in response to an LBR interrupt (that is, the time point of the predetermined data bit position is not the expected time point), the master device may output a NACK signal to the slave device through the data line. The master device may additionally generate SMBCLK according to the criteria of the slave device and terminate the read operation with a NACK signal and under STOP condition.

Figure 6B:
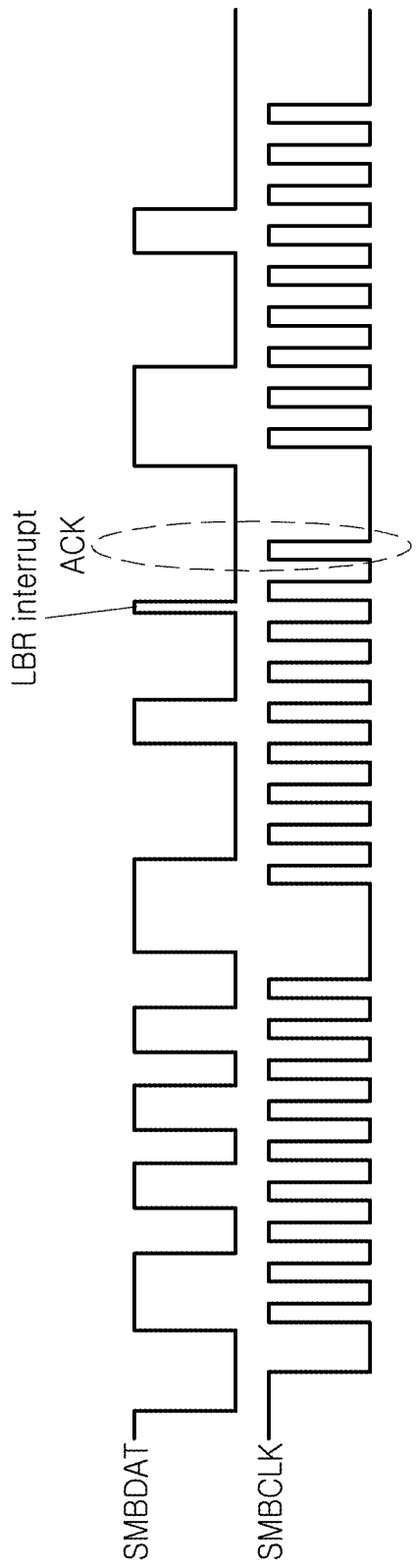
FIG. 6B is a timing diagram illustrating SMBus operation when no clock loss occurs according to an example embodiment of the present disclosure.

FIG. 6B is a timing diagram illustrating SMBus operation when no clock loss occurs according to an example embodiment. The bit address intended by the master device may match the time point expected by the device with the generated interrupt as criteria. The master device may transmit ACK and may maintain a read operation normally. For example, when the predetermined data bit position (i.e., Bit 0) is 0 in response to an LBR interrupt (that is, the time point of the predetermined data bit position is the expected time point), the master device may output an ACK signal (or an ACK bit) to the slave device through the data line.

When communication-related issues occur, the general SMBus may not initialize the interface other than SMBCLK 25 ms low hold timeout or SMBRST #. Differently from the above example, in example embodiments, through immediate recognition of a clock loss situation, unnecessary communication delays and error reports due to incorrect data values may be generally addressed. In example embodiments, by introducing an interrupt toggling another SMBDAT without adding a HW module, operation reliability and problem recovery function of the slave device may be improved without additional cost.

Generally, a bandwidth of high-speed interfaces has increased. As the amount of data processed for storage devices increases, related management interface information has also increased. Accordingly, the storage device may basically support management component transport protocol (MCTP). Here, MCTP may be basically used to exchange function and setting information, and may play an important role in managing and monitoring storage devices. MCTP may be the main technique of supporting intelligent platform management interface (IPMI). IPMI may provide standardized management interfaces for a server, a storage device, a network device, or the like. Through the interface, a system manager may remotely monitor the status of server and a storage device, may diagnose problems, and may execute management functions. MCTP may be primarily used to transfer data between various management sessions, and may encapsulate and transmit IPMI messages. Accordingly, interaction and management between a server and a storage device may be performed efficiently. MCTP may be one of the storage device's management interface functions and may operate with IPMI and may support efficient communication between the server and the storage device. Accordingly, the system manager may remotely monitor and manage the storage device. Also, the size of the data structure of vital product data (VPD) has also increased. VPD may include important information related to the product embedded in the storage device. Generally, VPD may include the data as follows: product identification data may include product identification information such as a manufacturer, a product name, a serial number, a model number, and the like. The device information may include basic information about the device, such as device capacity and interface type, speed, and the like. Configuration data may be device configuration information and may include functions supported by the device, options, and setting information. Vital product pages VPP may include multiple vital product pages in the VPD. Each VPP may have information about specific sections and may contain information from various aspects, for example, a logical device, a physical device, a fan and temperature.

Recently, in addition to the existing simple operation of periodically reading only minimal device information from the BMC, SMBus may support the entirety of non-volatile memory express (NVMe) commands and related management interface commands processed in-band. Accordingly, as the amount of data to be processed increases, when the SMBus for a specific slave device becomes stuck, other slave devices in the same environment may also experience communication delays. From the perspective of host environment, management interface system delays caused by the slave devices may be taken more seriously than in-band problems. This is because, unlike the in-band physical layer existing separately for each slave device, in SMBus, other slave devices and a single host may occupy a single bus in a many-to-one correspondence. Accordingly, on a high-speed communication system of 32.0 GT/s or higher, the self-error recovery and early termination function for the SMBus-based out of band system according to an example embodiment may ensure high stability.

In example embodiments, the SMbus master device may be a host device, and the SMbus slave device may be a storage device.

Figure 7:
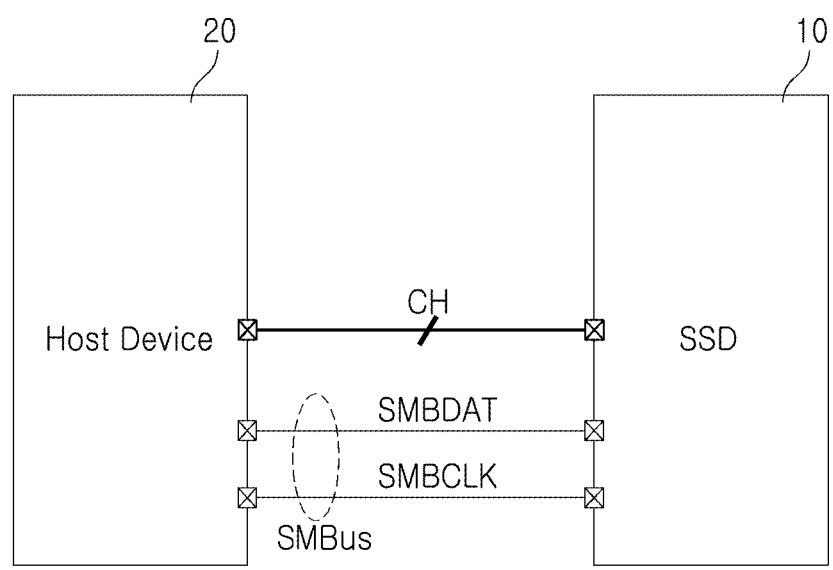
FIG. 7 is a diagram illustrating a host system according to an example embodiment of the present disclosure.

FIG. 7 is a diagram illustrating a host system according to an example embodiment. Referring to FIG. 7, a host system 1 may include a storage device 10 (SSD) and a host device 20.

The host device 20 may store data or read data in or from the storage device 10 through a main channel CH. Here, the main channel CH may transmit and receive data according to various host interfaces. For example, the host interface may be at least one of non-volatile memory express (NVMe) interface, peripheral component interconnect express (PCIe), serial at attachment (SATA), small computer system interface (SCSI), serial attached SCSI (SAS), universal storage bus (USB) attached SCSI (UAS), internet small computer system interface (iSCSI), Fiber Channel, fiber channel over Ethernet (FCoE).

The host device 20 may communicate with the storage device 10 through an auxiliary channel. Here, the auxiliary channel may transmit and receive data according to the SMBus interface supporting management component transport protocol (MCTP). During a read operation, the host device 20 may transmit a SMBCLK signal to the storage device 10 through the clock line and may receive a plurality of data bits from the storage device 10 through the data line in response to the SMBCLK signal, and in the section in which the SMBCLK signal is at low level before the last data bit is transmitted among the plurality of data bits, the LBR (last bit ready) interrupt signal may be received through the data line, whether the data bit position is 0 (i.e., Bit 0) in response to the LBR interrupt signal may be determined, and the generation of a NACK signal may be determined depending on the determination result.

In an example embodiment, when the data bit position is 0 in response to the LBR interrupt signal, the host device 20 may output an ACK signal to the storage device 10 through the data line. In an example embodiment, when the data bit position is not 0 in response to the LBR interrupt signal, the host device 20 may output a NACK signal to the storage device 10 through the data line. In an example embodiment, the read operation may be terminated in response to a NACK signal. In an example embodiment, the host device 20 may additionally generate an SMBCLK signal according to the criteria of storage device 10 and may terminate the read operation with a NACK signal and STOP conditions.

Figure 8:
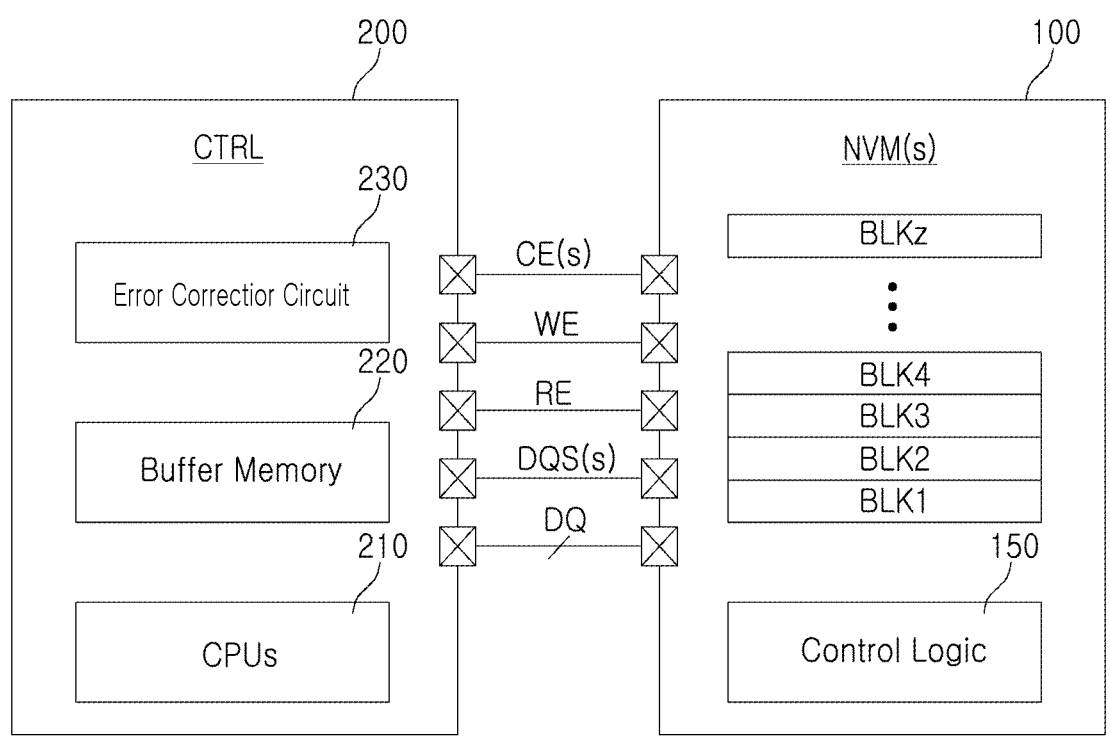
FIG. 8 is a diagram illustrating a storage device illustrated in FIG. 7 according to example embodiments.

FIG. 8 is a diagram illustrating a storage device illustrated in FIG. 7 according to example embodiments. Referring to FIG. 8, the storage device 10 may include at least one nonvolatile memory device NVM (100) and controller CTRL (200).

At least one nonvolatile memory device 100 may be implemented to store data. The nonvolatile memory device 100 may be a NAND flash memory, a vertical NAND flash memory, a NOR flash memory, a resistive random access memory (RRAM), a phase-change memory (PRAM), magnetoresistive random access memory (MRAM), ferroelectric random access memory (FRAM), and spin transfer torque random access memory (STT-RAM). Also, the nonvolatile memory device 100 may be implemented in a three-dimensional array structure. In example embodiments, a charge storage layer may be applied to a flash memory device consisting of conductive floating gates and may also be applied to a charge trap flash CTF in which the charge storage layer is formed as an insulating film. In the description below, for ease of description, the nonvolatile memory device 100 will be referred to as a vertical NAND flash memory device (VNAND).

Also, the nonvolatile memory device 100 may be implemented to include a plurality of memory blocks BLK1 to BLKz (z is an integer of 2 or more) and a control logic 150. Each of the plurality of memory blocks BLK1 to BLKz may include a plurality of pages Page 1 to Page m (m is an integer of 2 or more). Each of the plurality of pages Page 1 to Page m may include a plurality of memory cells. Each of the plurality of memory cells may store at least one bit.

The control logic 150 may implemented to receive a command and an address from the controller CTRL 200 and may perform operations corresponding to the received commands (a program operation, a read operation, an erase operation, etc.) on memory cells corresponding to the address. Also, the control logic 150 may be implemented to control the nonvolatile memory device 100 using control signals CLE, ALE, CE(s), WE, and RE). For example, during a read operation, the chip enable signal CE may be activated, the CLE may be activated in the command transmission section, the ALE may be activated in the address transmission section, and the RE may be toggled in the section in which data is transmitted through the data signal line (DQ). The data strobe signal (DQS) may be toggled with a frequency corresponding to the data input/output rate. Read data may be synchronized to a data strobe signal (DQS) and may be transmitted in sequence.

The controller CTRL (200) may be implemented to control at least one nonvolatile memory device 100. The controller 200 may include at least one processor 210 (central processing unit: CPU), a buffer memory 220 and an error correction circuit 230.

The processor 210 may be implemented to control overall operations of the storage device 10. The processor 210 may perform cache/buffer management, firmware management, garbage collection management, wear leveling management, data deduplication management, read refresh/reclaim management, bad block management, multi-stream management, mapping management of host data and nonvolatile memory, quality of service (QOS) management, system resource allocation management, nonvolatile memory queue management, read level management, erase/program management, hot/cold data management, power loss protection management, dynamic thermal management, initialization management, redundant array of inexpensive disk (RAID) management. Also, the processor 210 may be implemented to drive the parameter optimizer 211. The parameter optimizer 211 may derive optimal firmware parameters in response to a firmware parameter setting request from an external device (e.g., host) and may update the derived parameters as firmware parameters. For example, parameter optimizer 211 may infer performance equations related to firmware parameters by performing machine learning using a plurality of learning models and may derive optimal firmware parameters using the inferred performance equations.

The buffer memory 220 may be implemented as a volatile memory (e.g., a static random access memory (SRAM), dynamic RAM (DRAM), synchronous RAM (SDRAM) or a nonvolatile memory (a flash memory, PRAM phase-change RAM, magneto-resistive RAM (MRAM), resistive RAM (ReRAM), ferro-electric RAM (FRAM)).

The error correction circuit 230 may be implemented to generate an error correction code (ECC) during program operation and to recover data using the error correction code during read operation. That is, the error correction circuit 230 may generate an error correction code to correct a fail bit or an error bit of data received from the nonvolatile memory device 110. Also, the error correction circuit 230 may form data to which a parity bit is added by performing error correction encoding on data provided by the nonvolatile memory device 110. The parity bit may be stored in the nonvolatile memory device 110. Also, the error correction circuit 230 may perform error correction decoding on data output from the nonvolatile memory device 110. The error correction circuit 230 may correct errors using parity. The error correction circuit 230 may correct an error using low density parity check (LDPC) code, BCH code, turbo code, Reed-Solomon code, convolution code, recursive systematic code (RSC), a coded modulation, such as trellis-coded modulation (TCM) and block coded modulation (BCM). When error correction is not possible in the error correction circuit 230, a read retry operation may be performed.

Figure 9:
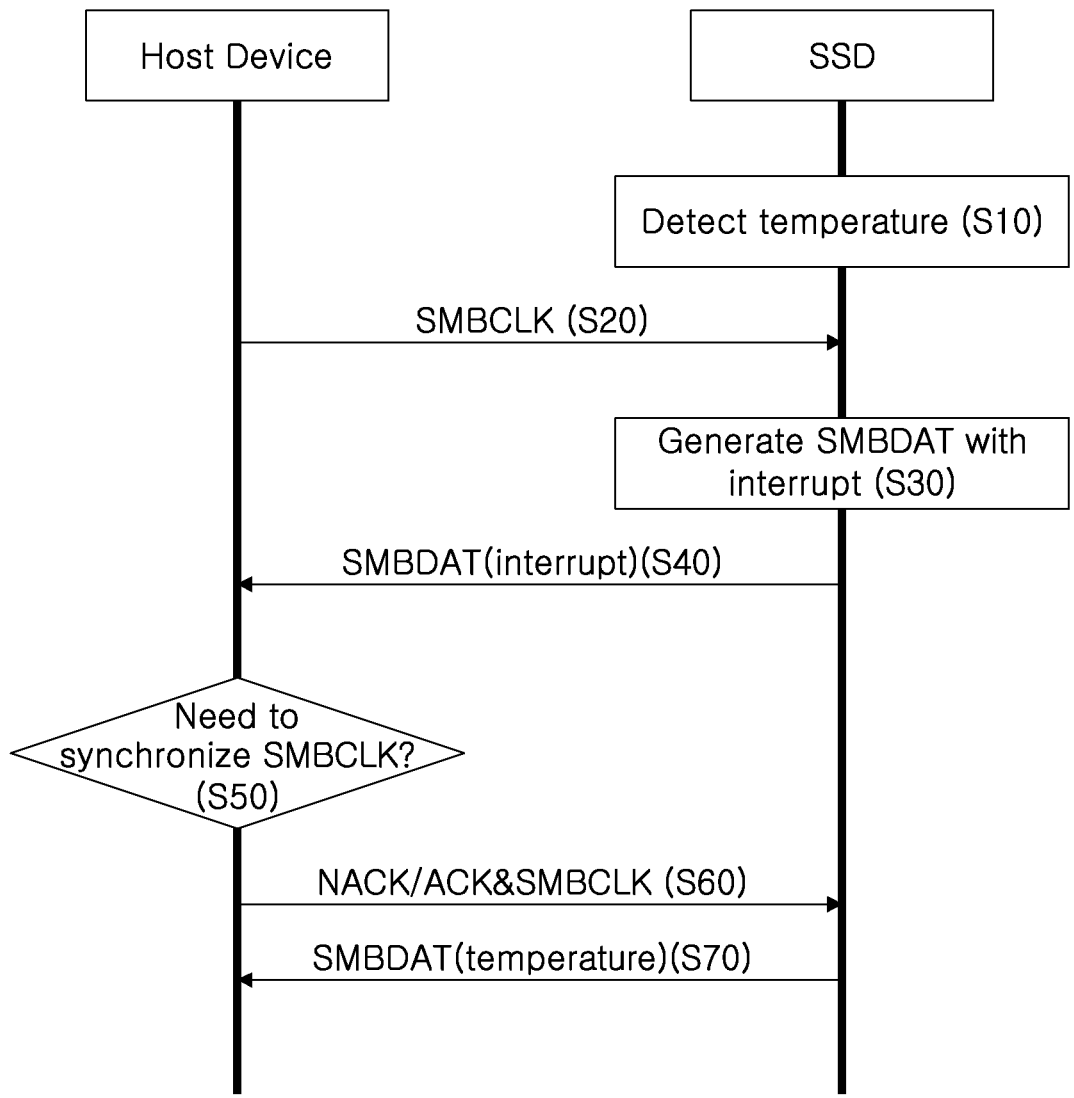
FIG. 9 is a ladder diagram illustrating a temperature information output operation of a storage device according to an example embodiment of the present disclosure.

FIG. 9 is a ladder diagram illustrating a temperature information output operation of a storage device according to an example embodiment. For example, the temperature information may be one of environment information. Referring to FIG. 9, the temperature information output operation of the storage device SSD may be performed as below.

The storage device SSD may detect the temperature of the storage device SSD periodically/aperiodically (S10). The storage device SSD may receive the SMBCLK signal from the host device (S20). The storage device SSD may generate SMBDAT having an interrupt under predetermined conditions (S30). The storage device SSD may output SMBDAT having an interrupt to the host device (S40). The host device may determine whether SMBCLK is synchronized based on the interrupt (S50). When SMBCLK synchronization is not required, the host device may output an ACK signal and may continuously output periodic SMBCLK. When SMBCLK synchronization is required, the host device may generate a NACK signal, may adjust SMBCLK, and may output the adjusted SMBCLK to the storage device SSD (S60). Thereafter, the storage device SSD may output temperature information corresponding to the temperature detected under predetermined conditions to the host device using SMBDAT (S70).

In an example embodiment, when there is clock loss of the SMBCLK signal, a not acknowledgment (NACK) signal may be received from the host device through a data line in response to the interrupt signal. In an example embodiment, the read operation may be terminated in response to the NACK signal. In an example embodiment, when there is no clock loss of the SMBCLK signal, the host device may output an ACK signal through the data line in response to the interrupt signal. In an example embodiment, the number of the plurality of data bits may be 8. In an example embodiment, to generate an interrupt signal, the data line may be toggled for a predetermined period of time in the section in which the SMBCLK signal is at a low level. In an example embodiment, the predetermined period of time may be determined by subtracting the data hold time and data setup time from the clock low period. In an example embodiment, the predetermined period of time may be between 0.12 µs and 2.7 µs. In an example embodiment, temperature information may be detected from a temperature sensor. The temperature sensor may be included in the storage device SSD. In an example embodiment, when receiving an ACK signal from a host device through a data line, temperature information may be output to the data line. In an example embodiment, the host device may terminate the read operation with a NACK signal and under a STOP condition.

To check errors in temperature information output due to clock loss in the example embodiment, the generation of an interrupt may be merely an example embodiment. The example embodiments may be applied to the output of any of the data related to management component transport protocol (MCTP) mentioned in the SMBus specification.

For example, the example embodiment may be used for status flags (to check the corresponding SMBus communication status and error report), SMART Warnings (to check the operation error report within the corresponding SSD device), and device life (period of use), and output of VID (Vendor ID), serial number, or the like. Accordingly, when a clock loss occurs in the serial number region, an incorrect serial number value may be read and a device missing (device is no longer detected from the server environment) situation may be recognized and reported. Also, when the clock is lost in the assumption that a Vendor ID (VID) is read, the device may be recognized as a non-existent device or a device from another vendor, thereby preventing the server from setting up expectations differently from the SSD.

The device described above may be implemented with hardware components, software components, and/or a combination of hardware components and software components. For example, the device and components described in an example embodiment may be implemented using one or more general-purpose or special-purpose computers such as a processor, a controller, an arithmetic logic unit (ALU), a digital signal processor, a microcomputer, a field programmable gate array (FPGA), and a programmable logic unit (PLU), a microprocessor, or any other device which may execute instructions and respond. A processing device may execute an operating system (OS) and one or more software applications running on the operating system. Also, a processing device may access, store, manipulate, process and generate data in response to the execution of software. For ease of description, a single processing device may be used, but the processing device may include a plurality of processing elements or a plurality of types of processing elements. For example, a processing device may include a plurality of processors or a processor and a controller. Also, other processing configurations, such as parallel processors, may be possible.

Software may include a computer program, codes, instructions, or a combination of one or more thereof, and may configure the processing device to operate as desired or to instruct the processing device independently or collectively. Software and/or data may be embodied in any type of machine, component, physical device, virtual equipment, computer storage medium or device to be interpreted by or to provide instructions or data to a processing device. Software may be distributed over networked computer systems and may be stored or executed in a distributed manner. Software and data may be stored on one or more computer-readable recording media.

The present invention may prevent signal missing phenomena during an SMBus read. It may improve data misses occurring in SMBus read situations. The present invention may ensure reliability concerning signal non-recognition during communication between master and slave devices. The present invention may perform operations to prevent unnecessary occupation of the bus.

According to the aforementioned example embodiments, a storage device and a method of operating the same may generate and output an LBR interrupt under predetermined conditions of the clock signal during a read operation.

Also, a storage device and a method of operating the same may avoid bus occupancy due to clock omission using the LBR interrupt.

While the example embodiments have been illustrated and described above, it will be configured as apparent to those skilled in the art that modifications and variations could be made without departing from the scope of the present invention as defined by the appended claims.

What is claimed is:

1. A method of operating a storage device, the method comprising:
   receiving a clock signal corresponding to a plurality of data bits and an acknowledgement (ACK) signal from a host device through a clock line during a read operation;
   outputting a data signal including the plurality of data bits from the storage device through a data line during the read operation;
   generating an interrupt signal when the clock signal is at a low level before outputting the last data bit from among the plurality of data bits;
   transmitting the interrupt signal to the host device through the data line; and
   receiving a not-acknowledgment (NACK) signal from the host device through the data line in response to the interrupt signal when there is clock loss of the clock signal.

2. The method of claim 1, further comprising:
   terminating the read operation in response to the NACK signal.

3. The method of claim 1, further comprising:
   receiving the ACK signal from the host device through the data line in response to the interrupt signal when there is no clock loss of the clock signal.

4. The method of claim 1, wherein the number of the plurality of data bits is 8.

5. The method of claim 1, wherein the generating of the interrupt signal includes toggling a signal of the data line for a predetermined period of time in a section in which the clock signal is at a low level.

6. The method of claim 5, wherein the predetermined period of time is determined by subtracting a data hold time and a data setup time from the section in which the clock signal is at a low level.

7. The method of claim 6, wherein the predetermined period of time is between 0.12 µs and 2.7 µs.

8. The method of claim 1, further comprising:
   detecting temperature information from a temperature sensor included in the storage device.

9. The method of claim 8, further comprising:
outputting the temperature information to the data line when the ACK signal is received from the host device through the data line.

10. The method of claim 1, further comprising:
by the host device, terminating the read operation under a STOP condition corresponding to the NACK signal.

11. A storage device, comprising:
at least one nonvolatile memory device; and
a controller configured to control the at least one nonvolatile memory device, and receive a clock signal from a host device,
wherein the controller is configured to communicate with the host device through a first interface or output environmental information to the host device through a second interface, and
wherein the storage device is configured such that the controller generates an interrupt signal when the clock signal is at a low level during a read operation for the environment information, and outputs the interrupt signal to the host device through a data line.

12. The storage device of claim 11, wherein the first interface includes an NVMe interface, and
wherein the second interface includes an SMBus interface supporting management component transport protocol (MCTP).

13. The storage device of claim 11, wherein the clock signal corresponding to data bits and an acknowledgment (ACK) signal is received from the host device through a clock line, and
wherein the interrupt signal is generated before the last bit among the data bits is output.

14. The storage device of claim 11, wherein, when there is a missing clock in the clock signal, the storage device is configured such that the controller receives a not-acknowledgment (NACK) signal from the host device through the data line in response to the interrupt signal.

15. The storage device of claim 11, wherein the environmental information includes temperature information, and
wherein the storage device further includes at least one temperature sensor configured to generate the temperature information.

16. A host system, comprising:
a storage device; and
a host device connected through a clock line and a data line,
wherein the host device is configured to:
transmit a clock signal corresponding to a plurality of data bits and an acknowledgement (ACK) signal to the storage device through the clock line,
receive a data signal including the plurality of data bits from the storage device through the data line,
receive an interrupt signal through the data line in a section in which the clock signal is at a low level before the last data bit from among the plurality of data bits is received,
first determine whether a time point of a predetermined data bit position is an expected time point in response to the interrupt signal, and
second determine to generate either the ACK signal or a not-acknowledgment (NACK) signal according to a result of the first determination.

17. The host system of claim 16, wherein, when the time point of the predetermined data bit position is the expected time point in response to the interrupt signal, the host system is configured such that the host device outputs the ACK signal to the storage device through the data line.

18. The host system of claim 16, wherein, when the time point of the predetermined data bit position is not the expected time point in response to the interrupt signal, the host system is configured such that the host device outputs the NACK signal to the storage device through the data line.

19. The host system of claim 16, wherein the host system is configured such that the host device terminates a read operation of the storage device in response to the NACK signal.

20. The host system of claim 16, wherein the host system is configured such that the host device additionally generates a clock signal according to criteria of the storage device and terminates a read operation in response to the NACK signal.

* * * * *